US007196656B2

(12) United States Patent
Shirakawa

(10) Patent No.: US 7,196,656 B2
(45) Date of Patent: Mar. 27, 2007

(54) APPARATUS FOR ESTIMATING DIRECTION OF ARRIVAL OF SIGNAL

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 11/018,985

(22) Filed: Dec. 21, 2004

(65) Prior Publication Data

US 2006/0066474 A1    Mar. 30, 2006

(30) Foreign Application Priority Data

Sep. 29, 2004    (JP) .............................. 2004-283515

(51) Int. Cl.
G01S 13/00    (2006.01)
G01S 7/40    (2006.01)
G01S 15/00    (2006.01)
G01S 17/00    (2006.01)
G01S 7/00    (2006.01)

(52) U.S. Cl. ............................ 342/147; 342/82; 342/89; 342/165; 342/173; 342/174; 342/175; 342/195; 342/417; 367/87; 367/99; 356/138; 356/140; 356/141.2

(58) Field of Classification Search .................. 367/87, 367/99–105, 117; 342/118, 146, 147–158, 342/175, 195, 450–465, 165–174, 385, 417–449, 342/82, 89; 356/138, 140–152.2
See application file for complete search history.

(56) References Cited

U.S. PATENT DOCUMENTS 3,618,090 A * 11/1971 Garrison ..................... 342/147

| | | | |
|---|---|---|---|
| 3,978,482 A | | 8/1976 | Williams et al. |
| 4,017,854 A | * | 4/1977 | Ross ........................... 342/147 |
| 6,104,346 A | * | 8/2000 | Rudish et al. .............. 342/424 |
| 6,137,434 A | | 10/2000 | Tohya et al. |
| 6,246,359 B1 | * | 6/2001 | Asano et al. ............... 342/158 |
| 6,762,711 B1 | * | 7/2004 | Doerfler ...................... 342/147 |
| 6,907,269 B2 | * | 6/2005 | Yamaguchi et al. ........ 342/147 |
| 7,046,186 B2 | * | 5/2006 | Rosenberg et al. ......... 342/147 |

FOREIGN PATENT DOCUMENTS

| EP | 0 898 174 | 2/1999 |
|---|---|---|
| EP | 0 987 561 | 3/2000 |
| EP | 0 987 563 | 3/2000 |
| EP | 1 486 796 | 12/2004 |

OTHER PUBLICATIONS

Solomon I S D et al., Receiver Array Calibration Using Disparate Sources, IEEE Transactions on Antennas and Propagation, IEEE Inc. New York, US vol. 47, No. 3, Mar. 1999, pp. 496-504, XP000830210 ISSN: 0018-926X *the whole document*.
Partial European Search Report dated Jan. 2, 2006.

* cited by examiner

*Primary Examiner*—Bernarr E. Gregory
(74) *Attorney, Agent, or Firm*—Katten Muchin Rosenman LLP

(57) ABSTRACT

An apparatus for estimating direction of arrival of signal is provided that has excellent performance in terms of angular resolution and the number of signals that can be identified. In an array sensor comprising a plurality of sensor elements, the two outermost sensor elements are alternately selected by a switch for use as a transmitting sensor, and the other sensor elements are selected in time division fashion as receiving sensors. With this arrangement, the effective aperture is increased to about twice the physical aperture, to improve angular resolution in a direction-of-arrival estimator.

10 Claims, 9 Drawing Sheets

APPARATUS FOR ESTIMATING DIRECTION OF ARRIVAL OF SIGNAL

BACKGROUND OF THE INVENTION

1. Field of the Invention

The present invention relates to an apparatus which estimates the direction of arrival of a signal by using an array sensor and a direction-of-arrival estimation method. The present invention can be applied to a radar, sonar, lidar, etc.

2. Description of the Related Art

As an example of the radar, sonar, lidar, etc., the radar projects forward a transmit wave modulated by a baseband signal such as a triangular wave, and receives a wave reflected from a target; the received reflected wave is then mixed in a mixer with a portion of the transmitted signal to obtain a baseband signal containing information about the target such as the relative distance and the relative velocity with respect to the target are calculated from the baseband signal. Such radars are commercially implemented as automotive radars, etc.

One possible method for determining the direction in which the target is located is to use an array antenna having a plurality of antenna elements to receive the reflected wave from the target, and to determine the direction of the target by applying a direction-of-arrival estimation method such as the well known beam-former method.

In a direction-of-arrival estimation method using an array antenna, for example, in the beam former method that scans the main lobe of the array antenna in a certain direction and determines the direction in which the output power is the greatest as being the direction of arrival, the width of the main lobe determines the angular resolution; therefore, if it is desired to increase the resolution so that the directions of many targets can be determined, the aperture length of the array must be increased by increasing the number of antenna elements. The same is true of the min-norm method that determines the direction of arrival from the eigenvalue and eigenvector of the correlation matrix of the array's received signal, and its extended algorithms such as MUSIC (MUltiple SIgnal Classification) and ESPRIT (Estimation of Signal Parameters via Rotational Invariance Techniques); that is, in these methods also, since the degree of the correlation matrix, i.e., the number of antenna elements, determines the number of targets that can be detected, the number of antenna elements must be increased in order to make it possible to determine the directions of many targets.

However, in the case of a radar apparatus such as an automotive radar where severe constraints are imposed on the mounting dimensions of the antenna, it has been difficult to increase the number of antenna elements without reducing the receiving power.

Japanese Unexamined Patent Publication No. 2000-155171 proposes a method that expands the effective aperture by switching between three to four transmitting antennas for operation. However, this method increases circuit complexity, and gives rise to such concerns as the accumulation of the discontinuities in the received signal phase due to the switching operation and the effect on the calibration due to the asymmetry of electromagnetic coupling.

Further, in the beam former method, the field of view of the radar is limited to within the range that can avoid grating lobes; here, as the antenna element spacing becomes closer to $\lambda/2$, the field of view becomes wider ($\pm 90°$). In reality, however, the field of view is not greater than about $\pm 10°$, since the spacing is usually about $2\lambda$ because of the constraints imposed on the physical dimensions and the gain of the antenna.

SUMMARY OF THE INVENTION

In view of the above problem, it is an object of the present invention to provide a direction-of-arrival estimating apparatus that exhibits excellent characteristics in applications where severe constraints are imposed on the mounting dimensions of an array sensor such as the array antenna or where it is desired to simply improve the angular resolution or increase the number of targets that can be identified.

According to the present invention, there is provided an apparatus for estimating direction of arrival of a signal comprising: an array sensor having first and second sensor elements located at outermost ends and one or more third sensor elements located inward thereof; switch means for selecting either one of the first and second sensor elements for transmission and one of the first, second, and third sensor elements for reception; switch control means for causing the switch means to select the first sensor element for transmission in a first period, while selecting at least the second and third sensor elements for reception in time division fashion, and for causing the switch means to select the second sensor element for transmission in a second period, while selecting at least the first and third sensor elements for reception in time division fashion, wherein the first and second periods are two periods alternating one after the other in cyclic fashion; and direction-of-arrival estimating means for estimating the direction of arrival of the signal from a received signal obtained at the sensor element selected for reception.

DESCRIPTION OF THE PREFERRED EMBODIMENTS

Figure 1:
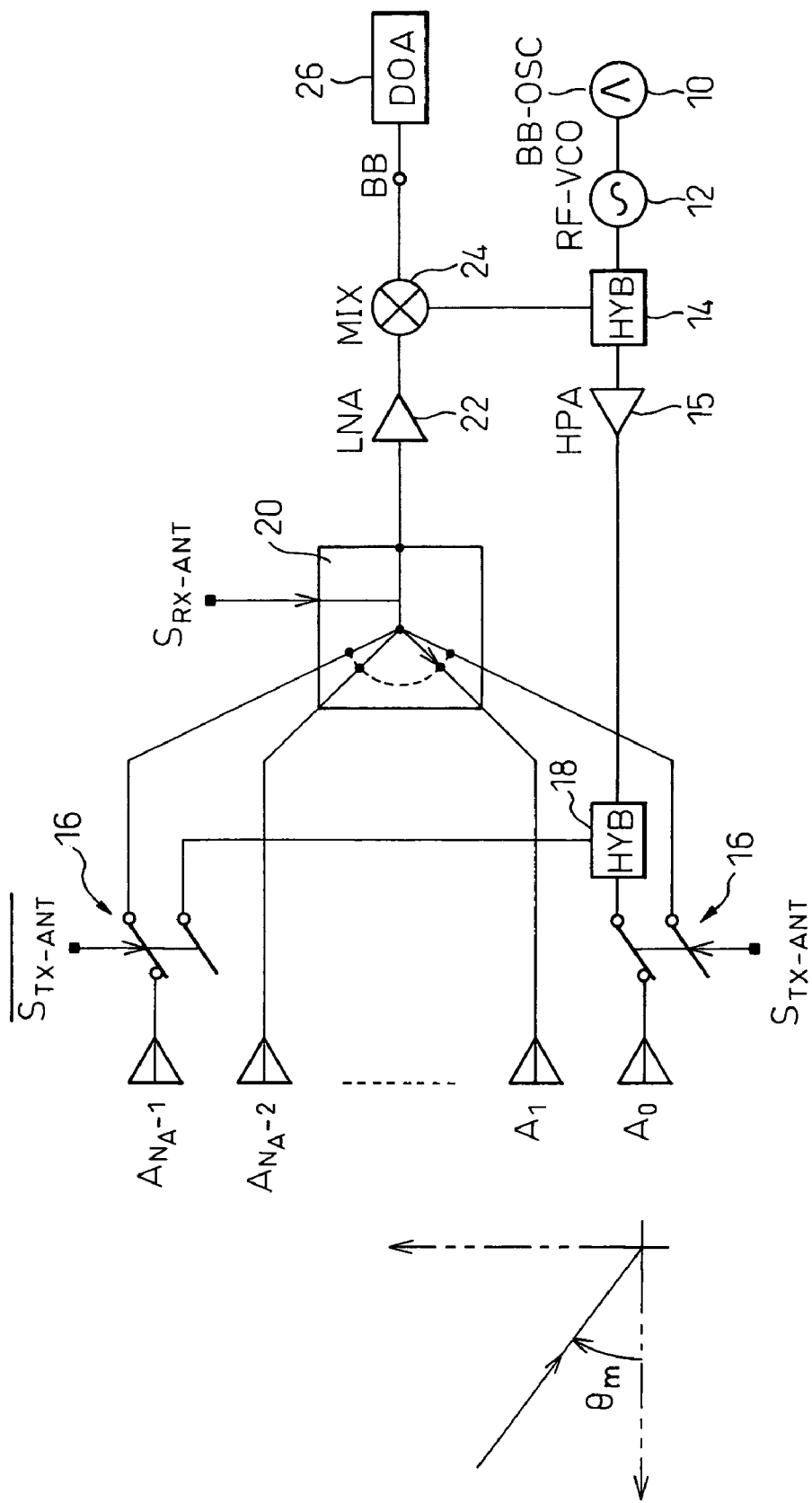
FIG. 1 is a block diagram of a radar apparatus according to a first embodiment of the present invention.

FIG. 1 shows the configuration of an FM-CW radar according to one embodiment of the present invention. In FIG. 1, a triangular wave generated by a baseband oscillator (BB-OSC) 10 is applied as a modulating signal to a radiofrequency voltage-controlled oscillator (RF-VCO) 12. The radiofrequency wave frequency-modulated by the triangular wave, output from the radiofrequency voltage-controlled oscillator 12, is passed through a hybrid 14, amplified by a high-power amplifier (HPA) 15, passed through a hybrid 18, and radiated forward from an antenna element A0 or $AN_A-1$, whichever is selected by a switch 16. A reflected wave from a target is received by antenna elements A1 to $AN_A-1$ or A0 to $AN_A-2$, and the received signal from the antenna element selected by a switch 20 is amplified by a low-noise amplifier (LNA) 22 and mixed in a mixer 24 with a portion of the transmitted signal separated by the hybrid 14. Based on the beat signal (baseband signal) output from the mixer 24, a direction-of-arrival estimator 26 determines the direction of arrival of the received wave, i.e., the direction $\theta_m$ in which the target is located, by using, for example, the beam former method.

Figure 2:
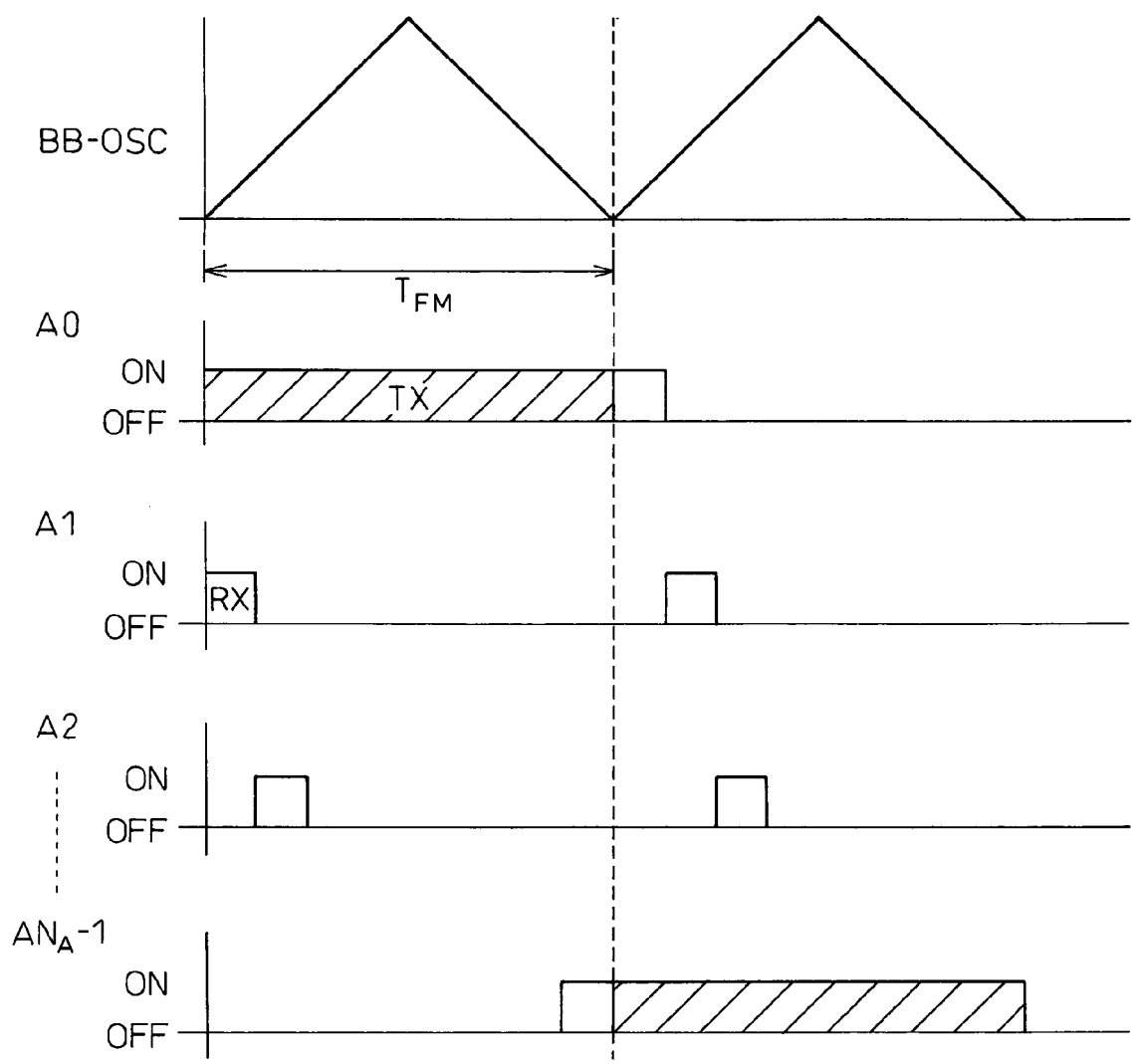
FIG. 2 is a timing chart showing the transition of the function of each antenna element in the radar apparatus of FIG. 1.

FIG. 2 shows the waveform of the triangular wave of period $T_{FM}$ that the baseband oscillator (BB-OSC) 10 outputs, and the transition of the function of the antenna elements A0 to $AN_A-1$ accomplished by the switches 16 and 20 controlled in synchronism with the triangular wave. In FIG. 2, the triangular wave is shown only for two periods, but it should be noted that the illustrated control is performed repeatedly. In FIG. 2, in the first period of the triangular wave, the antenna element A0 is selected as the transmitting antenna by the switch 16, and the other antennas A1 to $AN_A-1$ are sequentially selected as receiving antennas in time division fashion. In the second period of the rectangular wave, the antenna element $AN_A-1$ is selected as the transmitting antenna, and the other antennas A0 to $AN_A-2$ are sequentially selected as receiving antennas in time division fashion.

Figure 3:
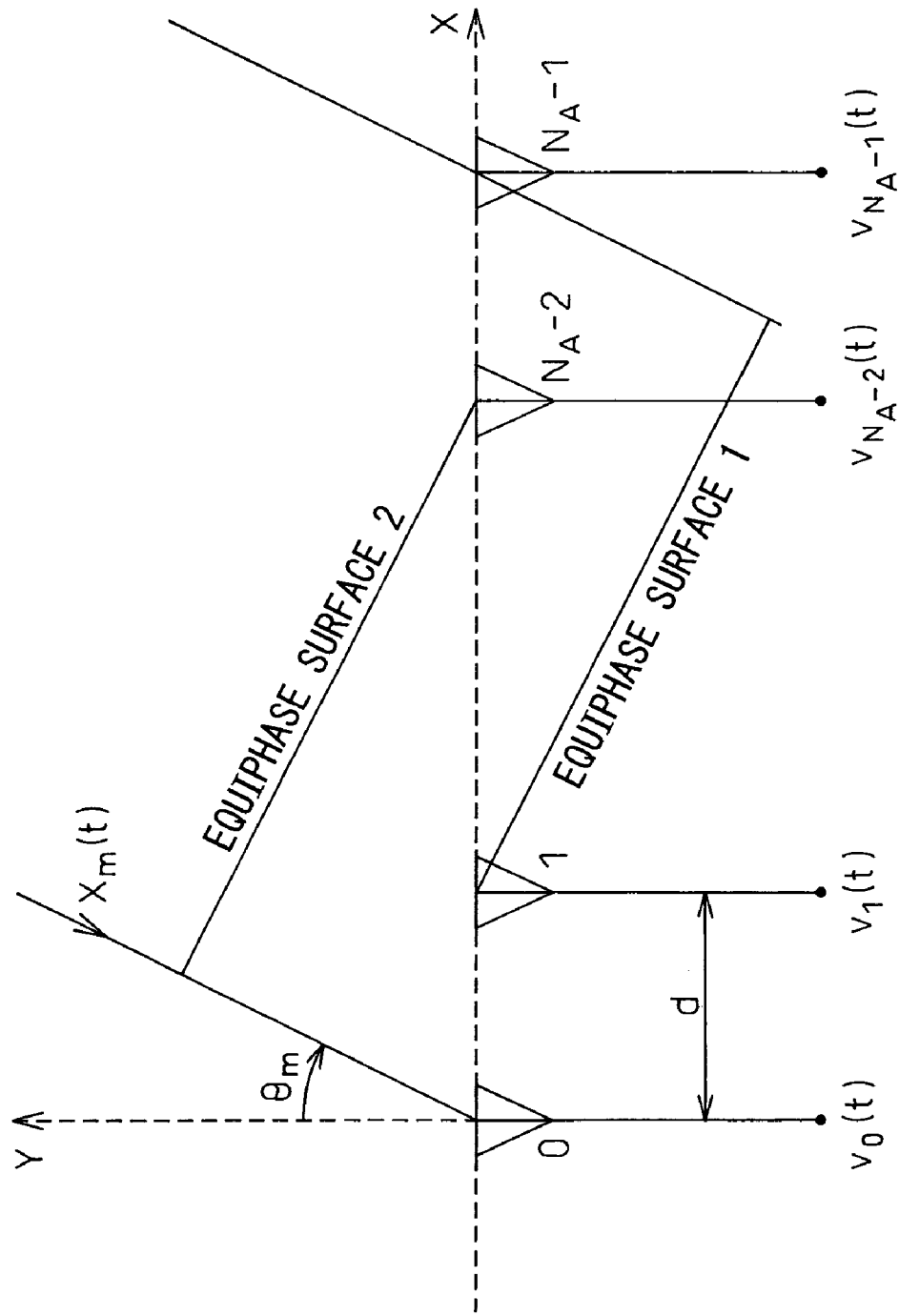
FIG. 3 is a diagram for explaining the present invention.

Referring to FIGS. 2 and 3, a description will be given by assuming, for simplicity of explanation, an equispaced linear array antenna comprising antenna elements A0 to $AN_A-1$ equally spaced at a distance d apart, as shown in FIG. 3.

Suppose here that, with the antenna element A0 functioning as the TX (transmit) antenna (the time represented by t), signals $x_m(t)$ from a number, $N_s$, of independent targets arrive at respective angles $\theta_m$ (m=0 to $N_s-1$); then, the phase difference between the signals $x_m(t)$ arriving at Al and Ak, with Al as the phase reference (equiphase surface 1), is given by $$\phi_m^k = -\frac{2\pi}{\lambda} kd\sin(\theta_m) \tag{1}$$

Therefore, the output $v_k(t)$ from Ak is expressed by the following equation together with a noise signal $n_k(t)$.

$$v_k(t) = \sum_{m=0}^{N_s-1} x_m(t)\exp(j\phi_m^k) + n_k(t) \tag{2}$$

Here, as for the direction of the arrival angle, the clockwise direction with respect to the positive direction (0°) of the Y axis is taken as positive.

Next, consider the situation where the antenna element $AN_A-1$ is selected as the TX antenna; then, the phase difference, with $AN_A-2$ as the phase reference (equiphase surface 2), is likewise given by $$\phi_m^k = \frac{2\pi}{\lambda} kd\sin(\theta_m) \tag{3}$$

Therefore, the output $v_k(t+T_{FM})$ from Ak at time $t+T_{FM}$ ($T_{FM}$ is the period of the modulating wave) is expressed by the following equation.

$$v_k(t+T_{FM}) = \sum_{m=0}^{N_s-1} x_m(t+T_{FM})\exp(j\phi_m^k) + n_k(t+T_{FM}) \tag{4}$$

To give a supplementary description of the latter operation mode, since the TX antennas are spaced $(N_A-1)d$ apart from each other, if Al is taken as the phase reference, the phase difference between the transmitted signal and the received signal is expressed by the following equation.

$$\phi_m^k = -\frac{2\pi}{\lambda}(k - N_A + 1)d\sin(\theta_m) = \frac{2\pi}{\lambda}(N_A - 1 - k)d\sin(\theta_m) \tag{5}$$

Accordingly, if the variation of the target angle that occurs during the antenna switching is sufficiently small (or the period $T_{FM}$ of the modulating wave is divided into smaller segments to an extent that the hypothesis holds, and the TX/RX switching is performed a plurality of times during that time), and if the system is stable to the shifting of the phase origin (to maintain the similarity of electromagnetic coupling, etc., the reference position of the RX antenna with respect to the TX antenna is rotationally symmetrical), the array that uses the extended signal vector defined by the following equation has an effective aperture of $2(N_A-1)d$ because of the synthetic aperture accomplished by the time division switching.

$$v=[v(t),v(t+T_{FM})]^t \tag{6}$$

More specifically, by transmitting alternately from the two outermost antenna elements of an array antenna having $N_A$ antenna elements, and by receiving the reflected wave from the target at the other antenna elements in time division fashion, an array antenna can be achieved that has an effective aperture of $2(N_A-1)$, which means that the effective aperture is increased to about twice the physical aperture.

As the array antenna of the present invention can be handled in the same way as conventional array antennas except that the aperture is in effect doubled to $2(N_A-1)$, the invention provides an effective compensating means when applying in the direction-of-arrival estimator 26 (FIG. 1) a spatial smoothing technique that suppresses correlative interference waves due to multiple reflections, etc. but that reduces the effective aperture. Further, the array antenna of the present invention has excellent symmetry, which means that, in the case of an equispaced linear array antenna, the received data, when the transmitting antenna is the antenna element A0 and the received data when the transmitting antenna is the antenna element $AN_A-1$, are in a rotational invariance relationship with each other (that is, it can be regarded as one equispaced linear array). Therefore, the invention provides a useful means when applying in the direction-of-arrival estimator 26 (FIG. 1) the ESPRIT algorithm that can achieve super resolution characteristics.

On the other hand, in equation (2), if time t is omitted, and the case where $N_s=1$, $x_i=1$, and $n_i=0$ is considered, the signal $v_l$ is expressed by the following equation.

$$v_1 = \exp\left[j\frac{2\pi}{\lambda}d\sin(\theta_1)\right] \quad (7)$$

Accordingly, the range of $\theta_l$ that can be estimated by the angle-of-arrival estimator is given by equation (8); as can be seen, when the range of the principal value of the inverse trigonometric function is considered, the range increases as d becomes closer to $\lambda/2$, and reduces as d becomes larger with respect to $\lambda/2$. It can therefore be seen that the angle range that can be measured can be increased by reducing the apparent magnitude of d.

$$\theta_1 = \sin^{-1}\left\{\frac{\lambda}{d}\left[\frac{1}{2\pi}\tan^{-1}\frac{\text{Im}(v_1)}{\text{Re}(v_1)}\right]\right\} \quad (8)$$

Figure 4:
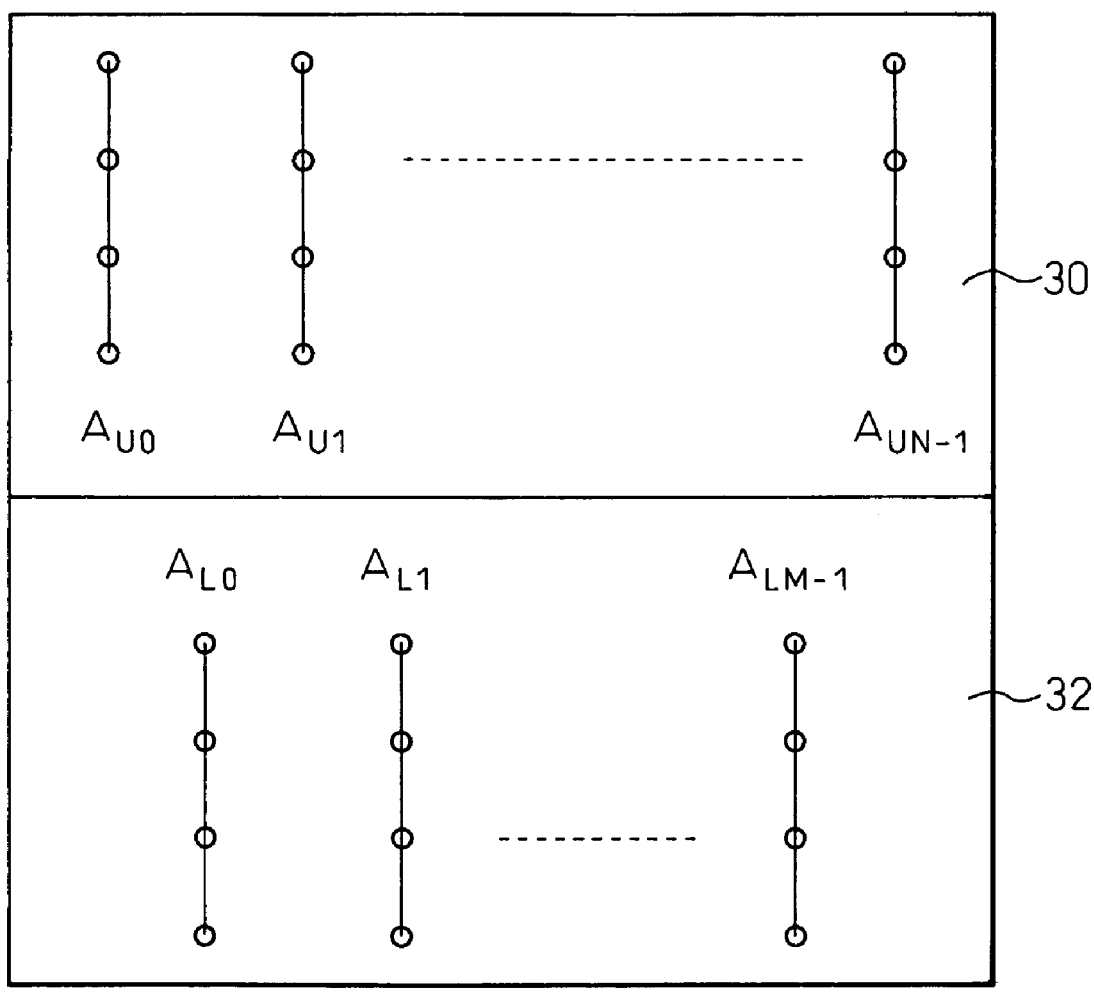
FIG. 4 is a diagram of an array antenna used in a radar apparatus according to a second embodiment of the present invention.

FIG. 4 shows an array antenna used in a radar apparatus according to a second embodiment of the present invention. The base plate forming the antenna surface is divided into an upper bank 30 and a lower bank 32, and the antenna elements arranged on the upper and lower banks 30 and 32 are offset relative to each other in a horizontal direction. With this arrangement, the effective element spacing is reduced to one half, achieving a corresponding increase in the field of view of the radar. In the example shown in FIG. 4, the outermost antenna elements AU0 and AUN-1 on the upper bank are alternately selected for use as the transmitting antenna. The example shown here is an equispaced array, but in the case of a non-equispaced array also, the effective element spacing can be reduced by arranging the antenna elements on one bank so as not to overlap, in position, any of the antenna elements on the other bank when viewed along the horizontal direction. The problem of reduced gain can be solved by arranging one antenna row into a plurality of rows.

Figure 5:
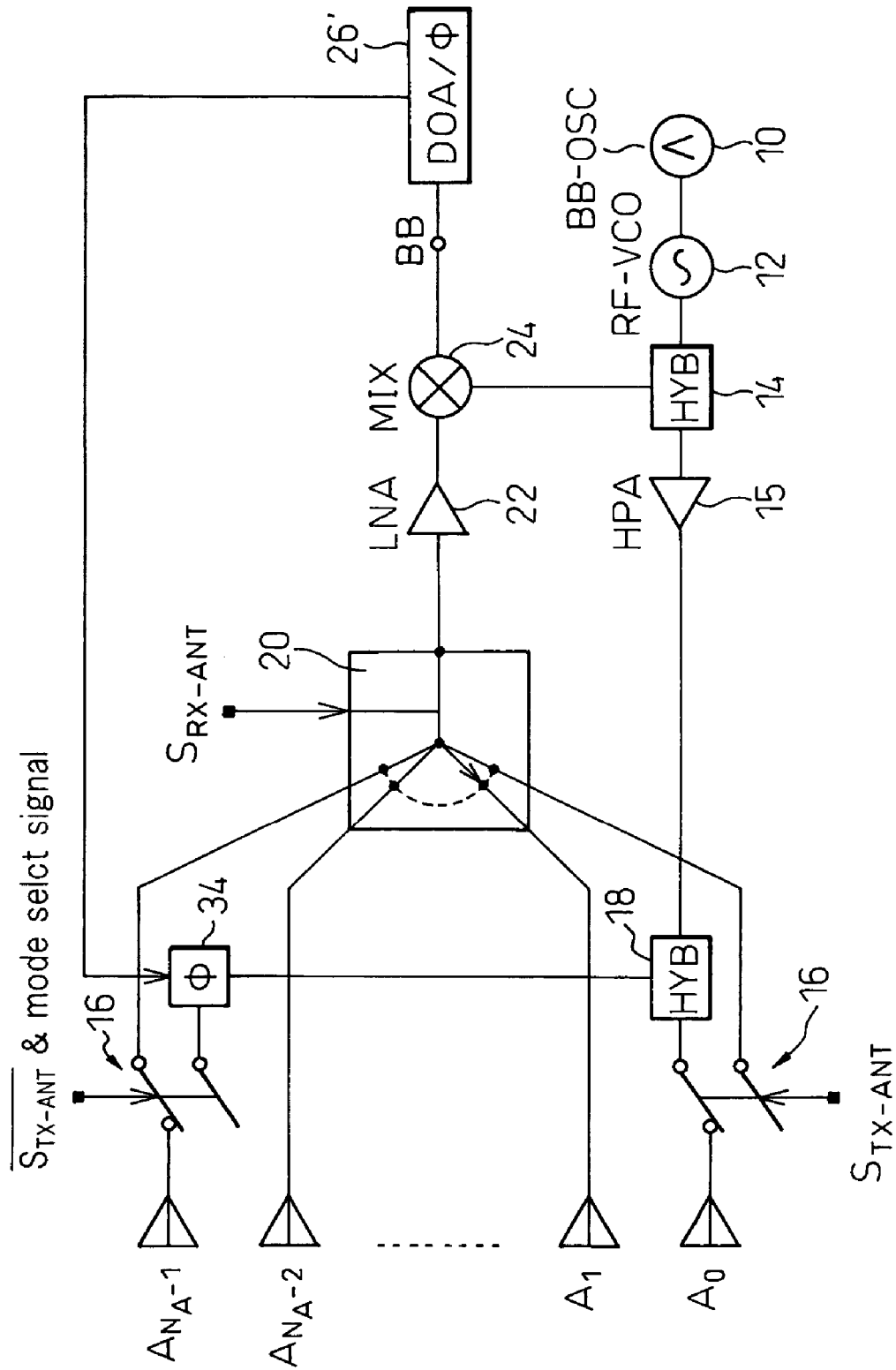
FIG. 5 is a block diagram showing the configuration of a radar apparatus according to a third embodiment of the present invention.

FIG. 5 shows the configuration of a radar apparatus according to a third embodiment of the radar apparatus of FIG. 1; the same component elements as those in FIG. 1 are designated by the same reference numerals, and a description of such elements will not be repeated here.

In a normal mode in which processing is performed to determine the direction of the target by using the method described with reference to FIG. 2, a phase shifter 34 is rendered inoperative with its phase shift amount set to zero, but is made operative in a tracking mode in which target tracking is performed by directing the transmit beam to the target after the direction of the target has been determined in the normal mode. In the tracking mode, the antenna elements A0 and $AN_A-1$ are both connected to the hybrid 18 and thus function as the transmitting antennas. Based on the target's direction θ determined in the normal mode, a direction-of-arrival estimator 26' determines the phase shift amount φ necessary to direct the transmit beam in the direction θ and applies it to the phase shifter 34. With the two antenna elements outputting transmit waves shifted in phase by φ, the transmit waves are directed in the particular direction θ so as to be able to track the target. In this case, reception is performed using the antenna elements A1 to $AN_A-2$ located inward of the transmitting antennas and, based on the target's direction θ estimated from the received signals, a new phase shift amount φ is determined and fed back to the phase shifter 34. It is desirable that the switching from the normal mode to the tracking mode be performed by computing the risk appropriate to the velocity and position of the target. From the viewpoint of implementing the tracking mode, the transmitting antennas need not necessarily be set as the outermost antenna elements; in fact, the tracking mode could be implemented if a plurality of suitably selected antenna elements, including ones located inward of the outermost elements, were used as the transmitting antennas. However, in the radar apparatus of the present invention which achieves increased effective aperture while retaining symmetry by switching the transmitting antenna between the outermost antenna elements, the tracking mode that uses the two outermost antenna elements as the transmitting antennas can be easily implemented by just adding one piece of hardware, i.e., the phase shifter.

In the configuration of FIG. 1 and the normal mode of FIG. 5, the result $\theta_0$ of the direction-of-arrival estimation performed by using one outermost antenna element A0 as the transmitting antenna and the other antenna elements A1 to $AN_A-1$ as the receiving antennas must agree with the result $\theta_1$ of the direction-of-arrival estimation performed by using the other outermost antenna element $AN_A-1$ as the transmitting antenna and the other antenna elements A0 to $AN_A-2$ as the receiving antennas. By utilizing this, the calibration of the array antenna, that is, the determination of the correction values for the direction vector a(θ) which is a function of the geometric parameters of the array antenna, can be performed. More specifically, the directions $\theta_0$ and $\theta_1$ are measured while varying the reference target position a number of times equal to the number of correction values, and a combination of correction values that minimizes the difference between the two is determined. Further, by using the algorithm described by I. S. D. Solomon, et al. in "Receiver array calibration using disparate sources," IEEE Trans. Antenna Propagat., vol. 47, pp. 496–505, for example, all the correction values can be determined based on a single reference target position. In the calibration performed in the tracking mode of the apparatus of FIG. 5, the two outermost antenna elements are set as the transmitting antennas, and the correction values are determined so that a single angle θ can be obtained from the received signals obtained at the inwardly located antenna elements.

Figure 6:
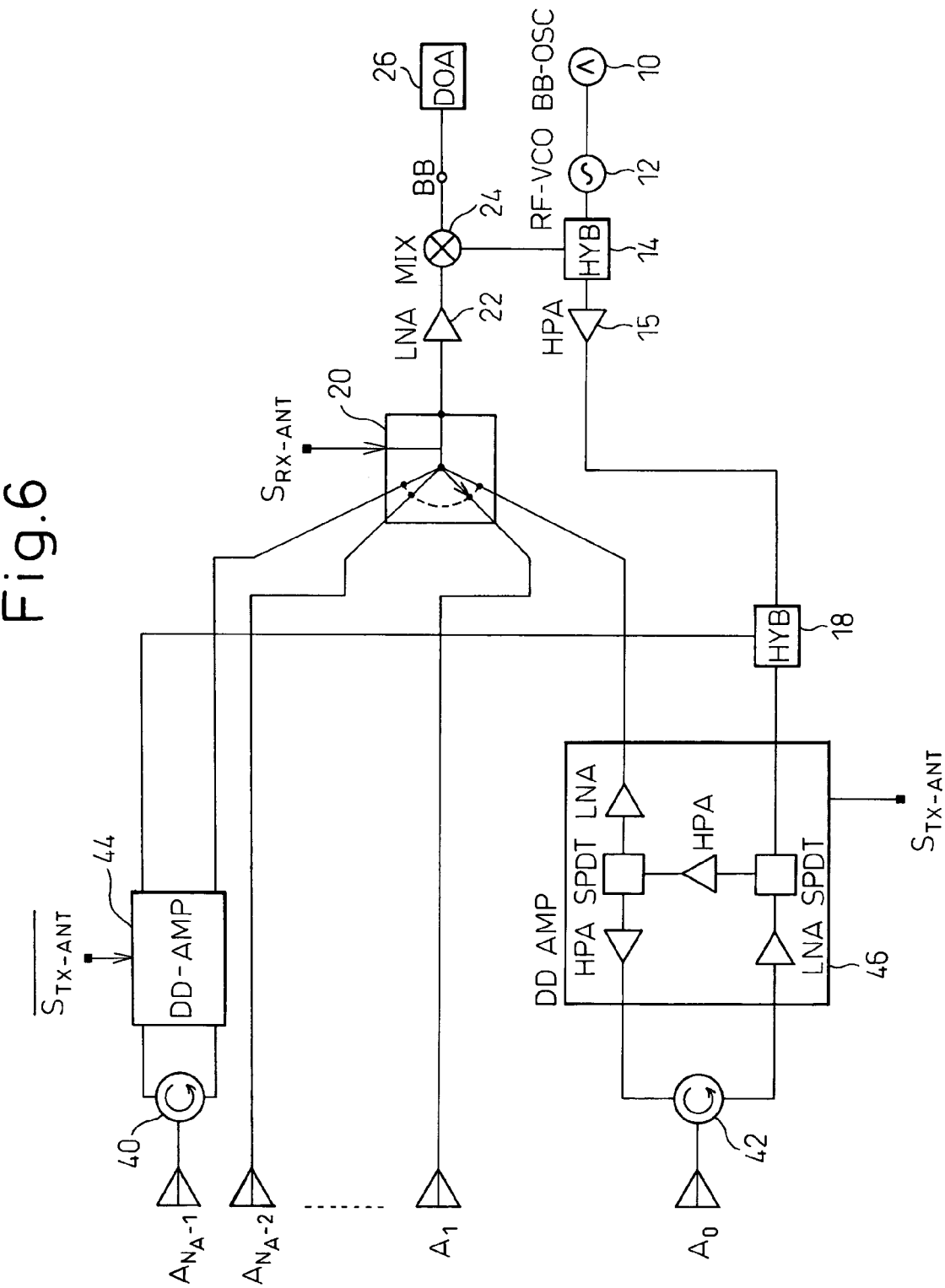
FIG. 6 is a block diagram showing the configuration of a radar apparatus according to a fourth embodiment of the present invention.

FIG. 6 shows the configuration of a radar apparatus according to still another embodiment of the present invention. The same component elements as those in FIG. 1 are designated by the same reference numerals, and a description of such elements will not be repeated here.

Figure 7:
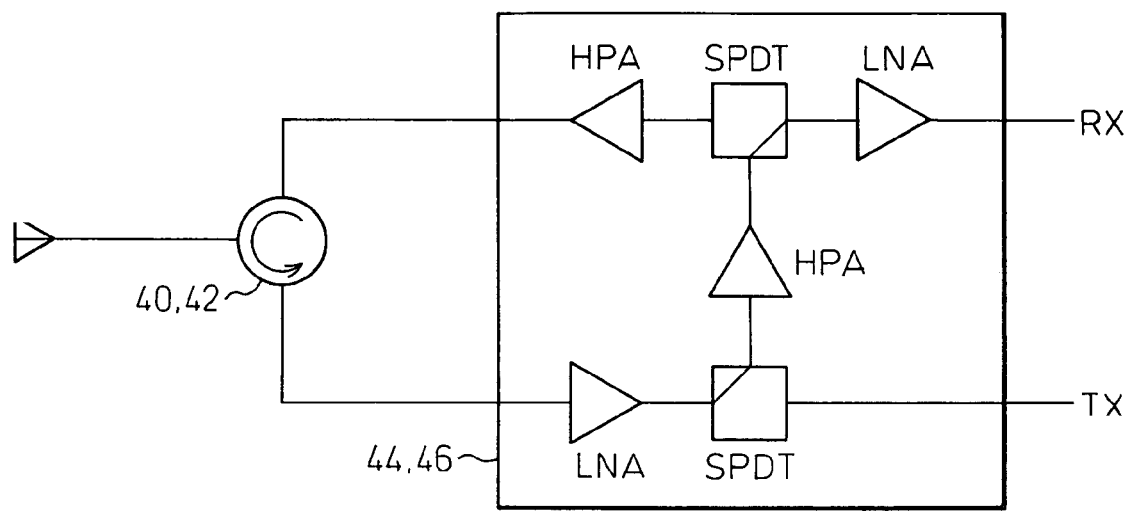
FIG. 7 is a diagram for explaining the operation of a bidirectional amplifier module used in the radar apparatus of FIG. 6.
Figure 8:
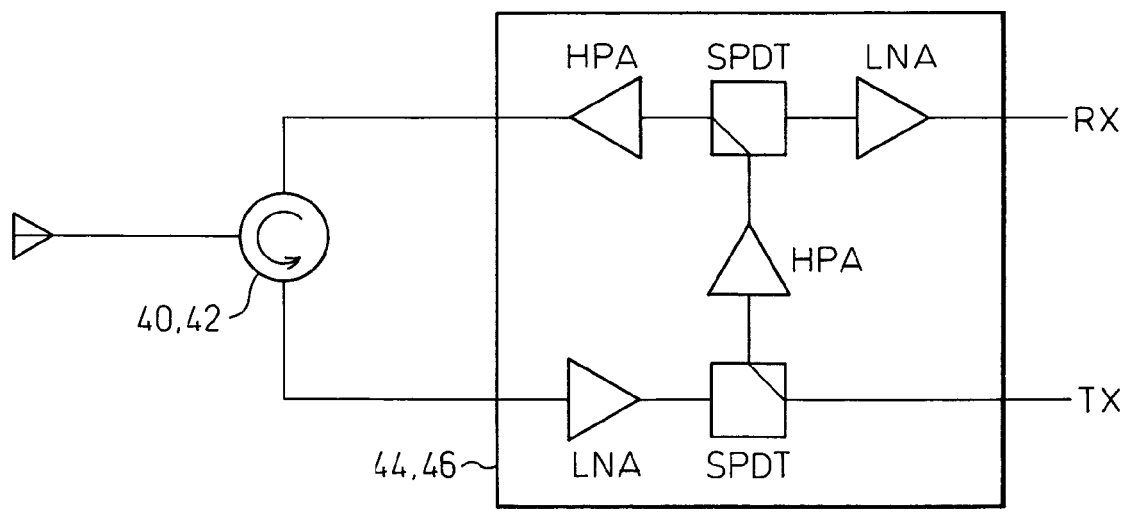
FIG. 8 is a diagram for explaining the operation of the bidirectional amplifier module used in the radar apparatus of FIG. 6.

In the embodiment shown in FIG. 6, the switches 16 used in the first embodiment to switch the outermost antenna elements A0 and $AN_A-1$ between transmit and receive modes are replaced by circulators as duplexers (or unidirectional devices such as hybrids or switches) 40 and 42 and bidirectional amplifier modules (DD-AMP) 44 and 46 which connect the transmitting-side inputs of the respective duplexers 40 and 42 to the transmitter output or connect the receiving-side outputs of the respective duplexers 40 and 42 to the receiver input. When the single-pole double-throw (SPDT) switches in the bidirectional amplifier modules 44 and 46 are set as shown in FIG. 7, the receiving-side outputs of the duplexers 40 and 42 are connected via LNA, SPDT, HPA, SPDT, and LNA to the receiver input, that is, the switch 20 in FIG. 6; on the other hand, when they are set as shown in FIG. 8, the transmitter output, that is, the hybrid 18 in FIG. 6, is connected via SPDT, HPA, SPDT, and HPA to the transmitting-side inputs of the duplexers 40 and 42. By using the antenna elements for both transmission and reception, a self-check of each antenna element becomes possible.

Figure 9:
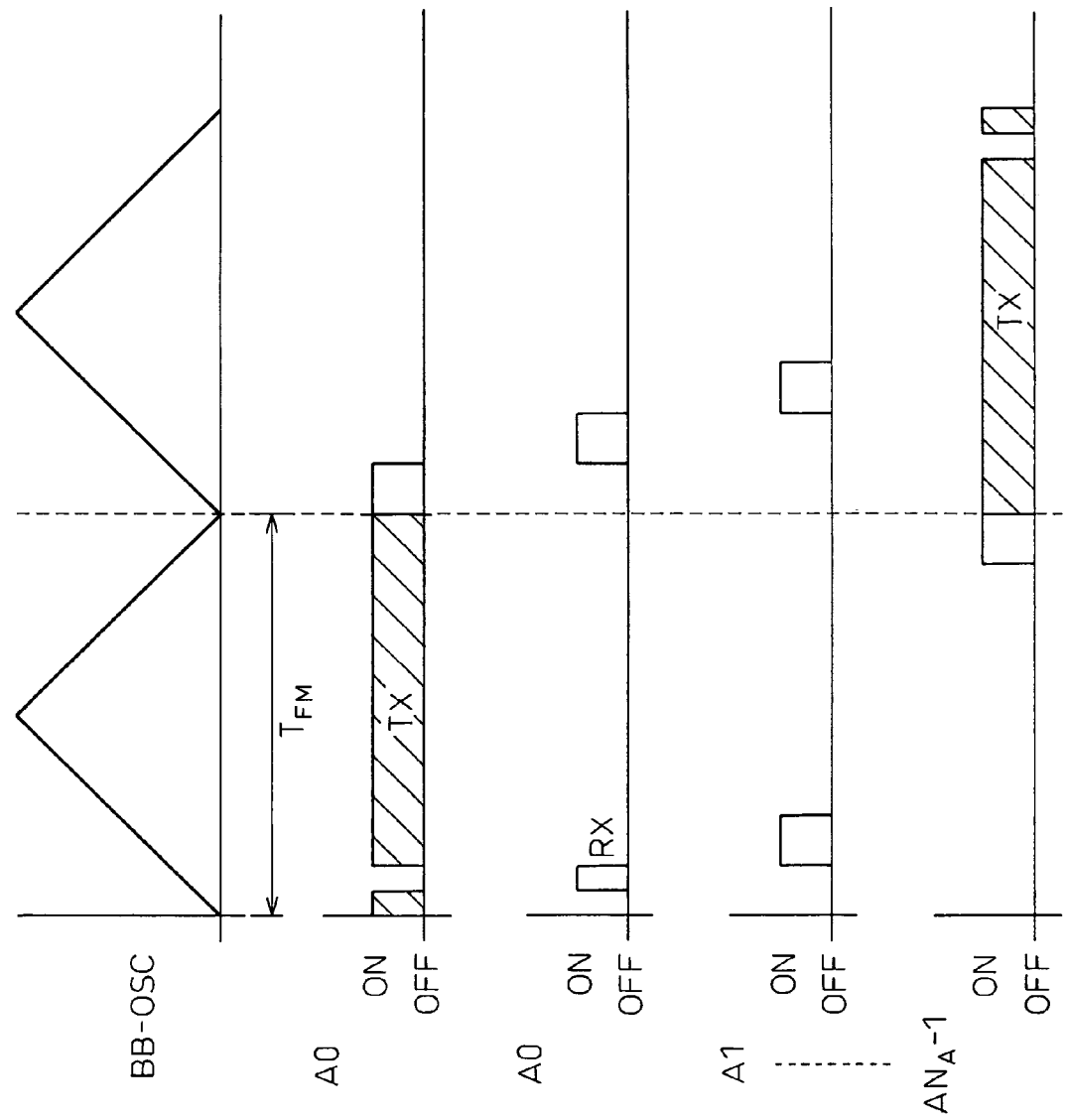
FIG. 9 is a timing chart showing the transition of the function of each antenna element in the radar apparatus of the present invention, implementing an example different from that shown in FIG. 2.

In each of the above embodiments, if, unlike the timing chart shown in FIG. 2, a time slot is assigned to every one of the antenna elements A0 to $AN_A-1$ within each period $T_{FM}$ of the modulating wave as shown in FIG. 9, with provisions made so that the antenna element functioning as the transmitting antenna is switched to the receiving antenna at the end of the assigned time slot, then the received signals are obtained from the number, $N_A$, of antenna elements in each period of the modulating wave, and the synthetic aperture is thus expanded to $2N_A$.

Figure 10:
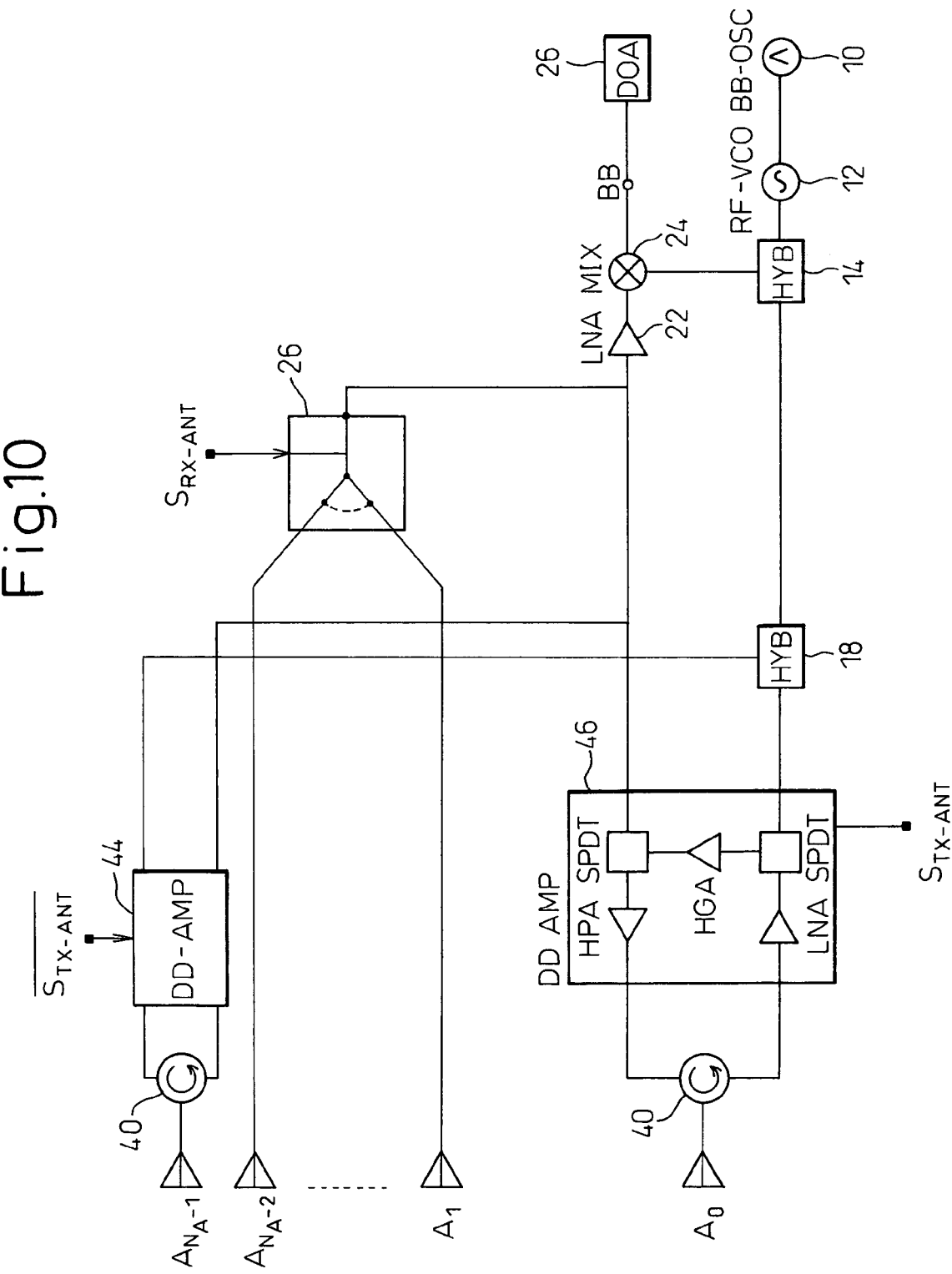
FIG. 10 is a block diagram showing one modified example of the radar apparatus of FIG. 6.

FIG. 10 shows one modified example of FIG. 6. In the example of FIG. 10, the receiving-side outputs of the bidirectional amplifier modules 44 and 46 are directly connected to the receiver input without interposing the switch 20 and, when the antenna A0 or $AN_A-1$ is functioning as a receiving antenna, the switch 26 is controlled so as not to select any one of the antennas. As the bidirectional amplifier modules 44 and 46 contain HPAs, the HPA 15 in FIG. 6 is omitted, and the HPA that is used in both transmit and receive modes in each of the bidirectional amplifier modules 44 and 46 is replaced by a high-gain front-end amplifier (HGA).

The invention claimed is:

1. An apparatus for estimating direction of arrival of a signal comprising:
   an array sensor having first and second sensor elements located at outermost ends and one or more third sensor elements located inward thereof;
   switch means for selecting either one of the first and second sensor elements for transmission and one of the first, second, and third sensor, elements for reception;
   switch control means for causing the switch means to select the first sensor element for transmission in a first period and to select at least the second and third sensor elements for reception in time division fashion, and for causing the switch means to select the second sensor element for transmission in a second period and to select at least the first and third sensor elements for reception in time division fashion, wherein the first and second periods are two periods alternating one after the other in cyclic fashion; and
   direction-of-arrival estimating means for estimating the direction of arrival of the signal from a received signal obtained at the sensor element selected for reception.

2. An apparatus for estimating direction of arrival of a signal according to claim 1, wherein the switch means includes a first switch which selects either one of the first and second antenna elements for connection to a transmitter, and a second switch which selects for connection to a receiver one from among the other one of the first and second antenna elements that is not connected to the transmitter and the third sensor elements, and wherein
   the switch control means causes the second switch means to select the second and third sensors in time division fashion in the first period and to select the first and third sensors in time division fashion in the second period.

3. An apparatus for estimating direction of arrival of a signal according to claim 1, further comprising first and second duplexers connected to the first and second sensor elements, respectively, enabling the respective sensor elements to be used for both transmission and reception, and wherein
   said switch means selectively connects a transmitting-side input of either one of the first and second duplexers to a transmitter, and selects either one of receiving-side outputs of die first and second duplexers or one of the third sensor elements for connection to a receiver, and
   the switch control means controls the switch means so that the receiving sides of the first and second duplexers and the third sensor elements are connected to the receiver in time division fashion in the first and second periods, so that the transmitting side of the first duplexer is connected to the transmitter in the first period except when the receiving side of the first duplexer is connected to the receiver, and so that the transmitting side of the second duplexer is connected to the transmitter in the second period except when the receiving side of the second duplexer is connected to the receiver.

4. An apparatus for estimating direction of arrival of a signal according to claim 1, wherein the sensor elements of the array sensor are arranged in two rows in such a manner that, any one of the sensor elements in one row does not overlap, in position, in a direction in which the rows extend, with any of the sensor elements in the other row.

5. An apparatus for estimating direction of arrival of a signal according to claim 1, further comprising a phase shifter provided between the transmitter and at least one of the first, second, and third sensor elements, and wherein
   the switch control means in a tracking mode causes the switch means to select a plurality of sensor elements for transmission from among the first, second, and third sensor elements, and
   the direction-of-arrival estimating means in the tracking mode calculates, based on the estimated direction of arrival, the amount of phase shift necessary to cause transmission waves from the selected ones of the first, second, and third antenna elements to be directed in the direction of arrival.

6. An apparatus for estimating direction of arrival of a signal according to claim 1, wherein the direction-of-arrival estimating means suppresses correlative interference waves by using a spatial smoothing technique.

7. An apparatus for estimating direction of arrival of a signal according to claim 1, wherein the direction-of-arrival estimating means estimates the direction of arrival by an beamform algorithm.

8. An apparatus for estimating direction of arrival of a signal according to claim 1, wherein the direction-of-arrival estimating means estimates the direction of arrival by an eigenspace algorithm.

9. An apparatus for estimating direction of arrival of a signal according to claim 1, wherein the direction-of-arrival estimating means estimates the direction of arrival by a maximum likelihood algorithm.

10. A calibration method for an apparatus for estimating direction of arrival of a signal comprising an array sensor having first and second sensor elements located at outermost ends and one or more third sensor elements located inward thereof, switch means for, selecting either one of the first and second sensor elements for transmission and one of the first, second, and third sensor elements for reception, switch control means for causing the switch means to select the first sensor element for transmission in a first period and to select at least the second and third sensor elements for reception in time division fashion, and for causing the switch means to select the second sensor element for transmission in a second period and to select at least the first and third sensor elements for reception in time division fashion, wherein the first and second periods are two periods alternating one after the other in cyclic fashion, and direction-of-arrival estimating means for estimating the direction of arrival of the signal front a received signal obtained at the sensor element selected for reception, said method comprising the steps of:
  determining a correction value of a direction vector; and
  calibrating said apparatus using said correction value so that a direction-of-arrival estimate computed from the received signals obtained at the second and third sensor elements when the first sensor element is selected as a transmitting sensor agrees with a direction-of-arrival estimate computed from the received signals obtained at the first and third sensor elements when the second sensor element is selected as a transmitting sensor.

* * * * *